United States Patent
Wenger et al.

(10) Patent No.: US 11,290,734 B2
(45) Date of Patent: Mar. 29, 2022

(54) ADAPTIVE PICTURE RESOLUTION RESCALING FOR INTER-PREDICTION AND DISPLAY

(71) Applicant: TENCENT AMERICA LLC, Palo Alto, CA (US)

(72) Inventors: Stephan Wenger, Palo Alto, CA (US); Jing Ye, San Jose, CA (US); Byeongdoo Choi, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/710,389

(22) Filed: Dec. 11, 2019

(65) Prior Publication Data

US 2020/0213605 A1 Jul. 2, 2020

Related U.S. Application Data

(60) Provisional application No. 62/704,040, filed on Jan. 2, 2019.

(51) Int. Cl.
*H04N 19/33* (2014.01)
*H04N 19/44* (2014.01)
(Continued)

(52) U.S. Cl.
CPC .......... *H04N 19/44* (2014.11); *H04N 19/105* (2014.11); *H04N 19/132* (2014.11); *H04N 19/172* (2014.11); *H04N 19/33* (2014.11); *H04N 19/423* (2014.11); *H04N 19/70* (2014.11); *H04N 19/80* (2014.11)

(58) Field of Classification Search
None
See application file for complete search history.

(56) References Cited

U.S. PATENT DOCUMENTS 9,736,454 B2 * 8/2017 Hannuksela ......... H04N 19/597
9,794,555 B2 * 10/2017 Baylon ................ H04N 19/169
(Continued)

OTHER PUBLICATIONS

Davies (NPL: "Resolution switching for coding efficiency and resilience," JCTVC-F158, 2011) (Year: 2011).*
(Continued)

*Primary Examiner* — Shadan E Haghani
(74) *Attorney, Agent, or Firm* — Sughrue Mion, PLLC

(57) ABSTRACT

A method of decoding a coded picture of a coded video sequence, the method being performed by at least one processor and the method includes decoding, from a first high level syntax structure for a plurality of pictures, a syntax element related to a reference segment resolution, decoding, from a second high level syntax structure that changes from a first coded picture to a second coded picture, a syntax element related to a decoded segment resolution, resampling a sample from a reference picture buffer for use for prediction by a decoder, the decoder decoding a segment at decoding resolution, and the sample from the reference picture buffer is in the reference segment resolution, decoding the segment in the decoded segment resolution into a decoded segment in the decoded segment resolution, and storing the decoded segment into the reference picture buffer.

12 Claims, 10 Drawing Sheets

(51) Int. Cl.
*H04N 19/70* (2014.01)
*H04N 19/172* (2014.01)
*H04N 19/105* (2014.01)
*H04N 19/423* (2014.01)
*H04N 19/80* (2014.01)
*H04N 19/132* (2014.01)

(56) References Cited

U.S. PATENT DOCUMENTS

| | | | |
|---|---|---|---|
| 10,051,269 B2* | 8/2018 | Rodriguez | H04N 19/105 |
| 10,979,727 B2* | 4/2021 | Hannuksela | H04N 19/167 |
| 2006/0072672 A1 | 4/2006 | Holcomb et al. | |
| 2007/0160153 A1 | 7/2007 | Sullivan | |
| 2013/0016769 A1 | 1/2013 | Chen et al. | |
| 2014/0219346 A1 | 8/2014 | Ugur et al. | |
| 2014/0355676 A1 | 12/2014 | Seregin et al. | |
| 2015/0016503 A1 | 1/2015 | Rapaka et al. | |
| 2016/0227244 A1 | 8/2016 | Rosewarne | |
| 2018/0007395 A1 | 1/2018 | Ugur et al. | |
| 2020/0186833 A1* | 6/2020 | Oh | H04N 19/172 |
| 2020/0366929 A1* | 11/2020 | Sun | H04N 19/59 |

OTHER PUBLICATIONS

Written Opinion in International Application No. PCT/US2019/068675, dated Mar. 10, 2020.

International Search Report in International Application No. PCT/US2019/068675, dated Mar. 10, 2020.

Byeongdoo Choi et al., "AHG8: Signaling and Filtering for Reference Picture Resampling", Joint Video Experts Team (JVET) of ITU-T SG 16 WP 3 and ISO/IEC JTC 1/SC 29/WG 11, JVET-O0332, 2019 (8 pages total).

Extended European Search Report dated Jan. 4, 2022 in European Application No. 19907865.0.

Stephan Wenger et al., "[AHG19] On Signaling of Adaptive Resolution Change", Joint Video Experts Team (JVET) of ITU-T SG 16 WP 3 and ISO/IEC JTC 1/SC 29/WG 11, JVET-N0052, 2019 (11 pages total).

* cited by examiner

FIG. 5

| seq_parameter_set_rbsp ( ) { | Descriptor |
|---|---|
| ... | |
| adaptive_picture_resolution | u(1) |
| if( adaptive_picture_resolution ) { | |
| reference_pic_width_in_luma_samples | ue(v) |
| reference_pic_height_in_luma_samples | ue(v) |
| output_pic_width_in_luma_samples | ue(v) |
| output_pic_height_in_luma_samples | ue(v) |
| } | |
| ... | |
| } | |

| pic_parameter_set_rbsp ( ) { | Descriptor |
|---|---|
| ... | |
| if( adaptive_picture_resolution ) { | |
| decoded_pic_width_in_luma_samples | ue(v) |
| decoded_pic_height_in_luma_samples | ue(v) |
| } | |
| ... | |
| } | |

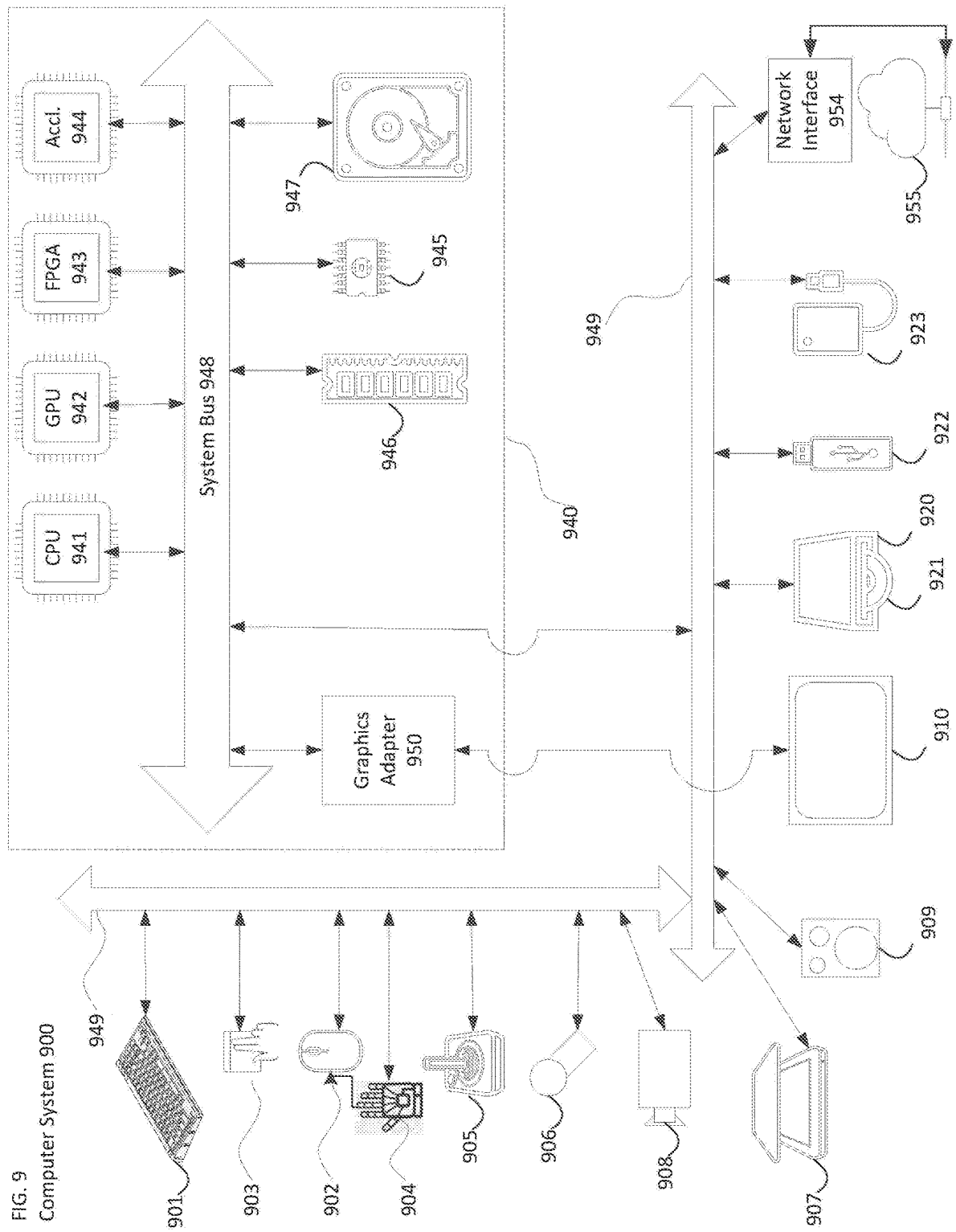

ADAPTIVE PICTURE RESOLUTION RESCALING FOR INTER-PREDICTION AND DISPLAY

CROSS-REFERENCE TO RELATED APPLICATION

This application claims priority from U.S. Provisional Patent Application No. 62/704,040, filed on Jan. 2, 2019, in the United States Patent and Trademark Office, which is incorporated herein by reference in its entirety.

BACKGROUND

1. Field

The disclosed subject matter relates to video coding and decoding, and more specifically, to syntax elements for adaptive picture resolution rescaling in high level syntax structure and the related decoding and scaling process of a picture segment.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Basic information theory suggests that a spatially lower resolution representation of a picture series of pictures of a given content can be compressed into fewer bits than a larger representation. Accordingly, when there is insufficient bandwidth or storage, or for cost sensitive applications where high spatial resolution is not required, downsampling of input series of pictures before encoding and respective upsampling after decoding to obtain a picture suitable for display has been in use for decades. For example, at least some MPEG-2 based TV distribution/display systems change, outside the coding loop, the horizontal resolution of the picture potentially on a per Group of Picture basis when the bandwidth available over the channel is insufficient to allow for good reproduced quality. In that regard, it should be noted that many video codecs have a "break point", also known as "knee" (in the Rate-Distortion curve) where the gradual quality degradation through increasing quantizer values (in order to stay within a rate envelope) breaks down and a sudden significant quality degradation occurs. As some video distribution systems operate very near to the break point for average complexity content, sudden increases in activities can lead to annoying artifacts that cannot easily be compensated by post-processing technology.

While changing the resolution outside the coding loop may be, from a video codec implementation and specification viewpoint, a relatively simple problem, it is also not particularly effective. That is because a change in resolution may require an intra code picture, which in many cases can be many times larger than the inter coded pictures most common in coded video bitstreams. Adding the additional strain of an intra coded picture to combat what can essentially be a bandwidth-starvation issue can be counter-productive, requiring large buffers and the associated large possible delay to be effective.

For delay-critical application, mechanisms have been devised that allow changing the resolution of a video sequence in the coding loop, and without the use of intra coded pictures. As those technologies require the resampling of reference pictures, they are commonly known as reference picture resampling (RPR-) techniques. RPR has been introduced into standardized video coding, and has seen relatively wide deployment in certain video conferencing systems, in ITU-T Rec. H.263 Annex P, published in 1998. This technology suffers at least from the following shortcomings: 1. The syntax used to signal reference picture resampling is not error resilient, 2. the up and downsample filters employed—bi-linear filters—while computationally inexpensive, are not very conducive to good video quality, 3. the specified technology, which allows for "warping" may be overly rich in unnecessary and unwarranted features, and 4. The technology can be applied only to a whole picture and not a picture segment.

A more recent video coding technology known as AV1 also has limited support for RPR. It suffers from problems similar to problems #1 and #4 above, and, in addition, the filters employed are very complex for certain applications.

SUMMARY

According to embodiments, a method of decoding a coded picture of a coded video sequence is performed by at least one processor, and the method includes decoding, from a first high level syntax structure for a plurality of pictures, a syntax element related to a reference segment resolution, decoding, from a second high level syntax structure that changes from a first coded picture to a second coded picture, a syntax element related to a decoded segment resolution, resampling a sample from a reference picture buffer for use for prediction by a decoder, the decoder decoding a segment at decoding resolution, and the sample from the reference picture buffer is in the reference segment resolution, decoding the segment in the decoded segment resolution into a decoded segment in the decoded segment resolution, and storing the decoded segment into the reference picture buffer.

According to embodiments, an apparatus for decoding a coded picture of a coded video sequence includes at least one memory configured to store computer program code; and at least one processor configured to access the at least one memory and operate according to the computer program code, the computer program code including first decoding code configured to decode, from a first high level syntax structure for a plurality of pictures, a syntax element related to a reference segment resolution, second decoding code configured to decode, from a second high level syntax structure that changes from a first coded picture to a second coded picture, a syntax element related to a decoded segment resolution, resampling code configured to resample, a sample from a reference picture buffer for use for prediction by a decoder, the decoder decoding a segment at decoding resolution, and the sample from the reference picture buffer is in the reference segment resolution, third decoding code configured to decode the segment in the decoded segment resolution into a decoded segment in the decoded segment resolution, and storing code configured to store the decoded segment into the reference picture buffer.

According to embodiments, a non-transitory computer-readable storage medium storing a program for decoding a coded picture of a coded video sequence includes instructions that cause a processor to decode, from a first high level syntax structure for a plurality of pictures, a syntax element related to a reference segment resolution, decode, from a second high level syntax structure that changes from a first coded picture to a second coded picture, a syntax element related to a decoded segment resolution, resample, a sample from a reference picture buffer for use for prediction by a decoder, the decoder decoding a segment at decoding resolution, and the sample from the reference picture buffer is in the reference segment resolution, decode the segment in the decoded segment resolution into a decoded segment in the decoded segment resolution, and store the decoded segment into the reference picture buffer.

BRIEF DESCRIPTION OF THE DRAWINGS

Further features, the nature, and various advantages of the disclosed subject matter will be more apparent from the following detailed description and the accompanying drawings in which:

FIG. 5 is a syntax diagram in accordance with an embodiment.

FIG. 9 is a schematic illustration of a computer system in accordance with an embodiment.

DETAILED DESCRIPTION

In order to solve the quality issues that can occur when operating a video coding near the break-point for average content when high activity content occurs, an in-loop RPR technology is needed. In contrast to known technologies, this technology needs to employ efficient filters both from a performance and computationally complexity viewpoint, needs to be error resilient, and needs to be applicable to only parts of a picture namely an (at least rectangular) picture segment.

Figure 1:
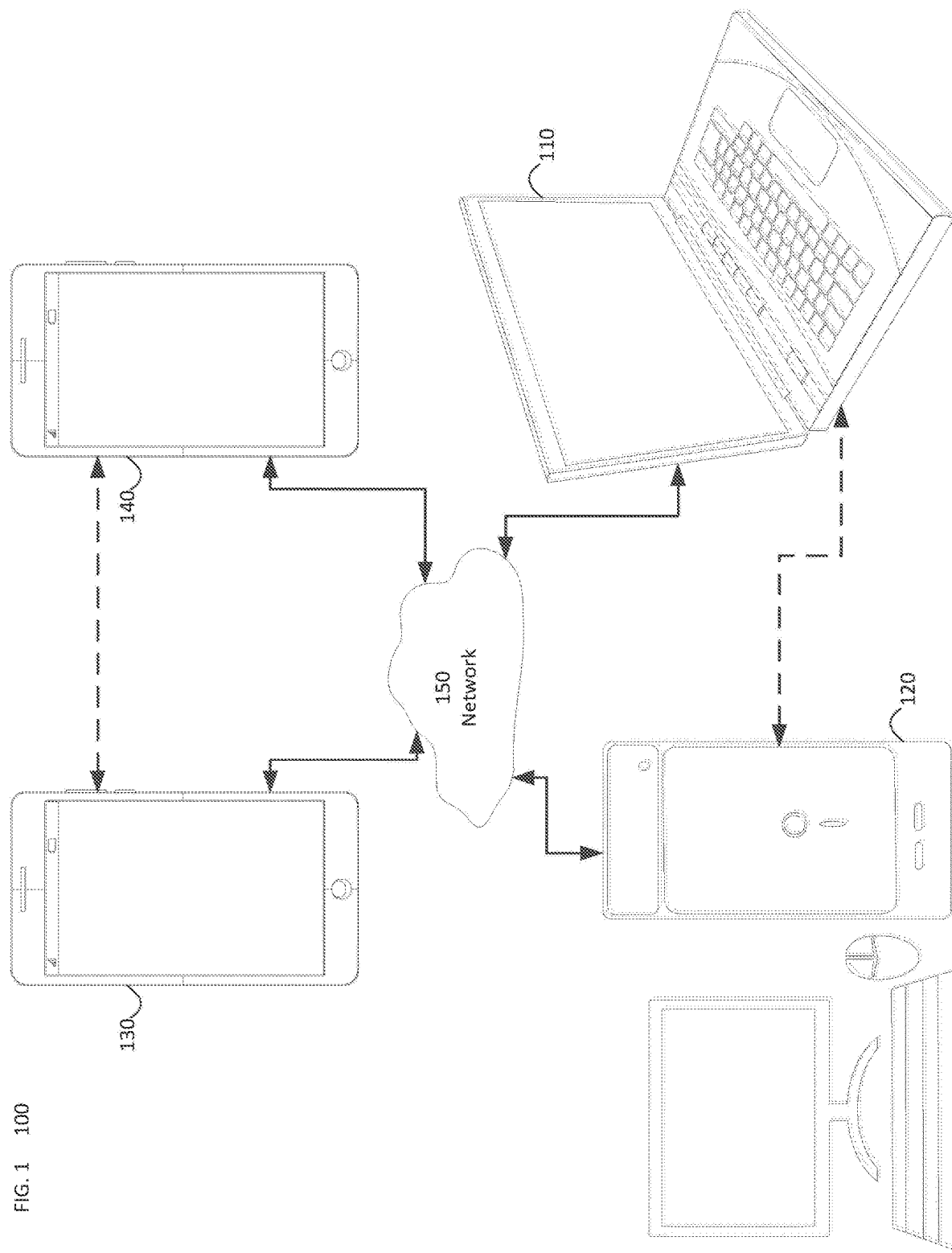
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
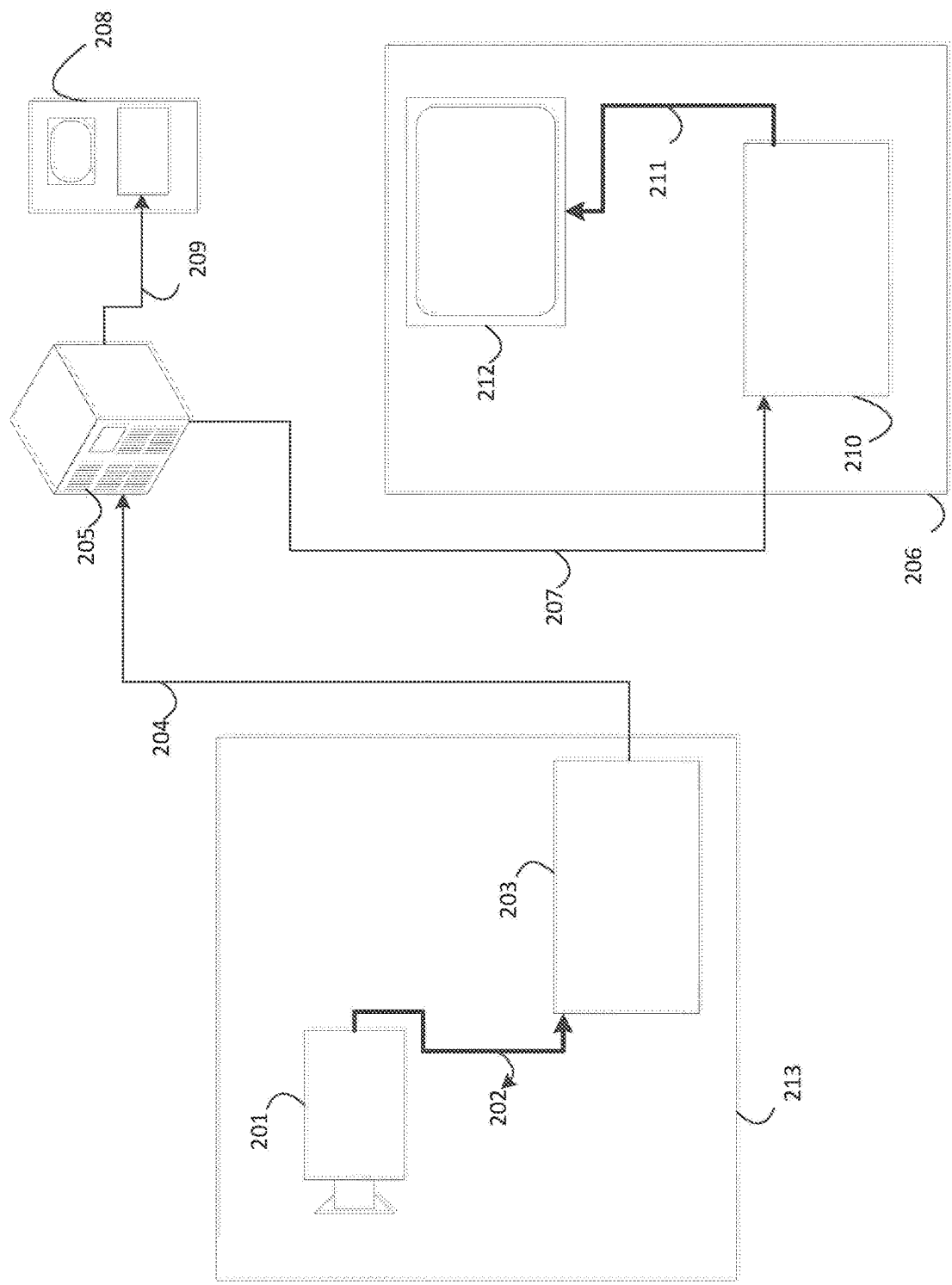
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
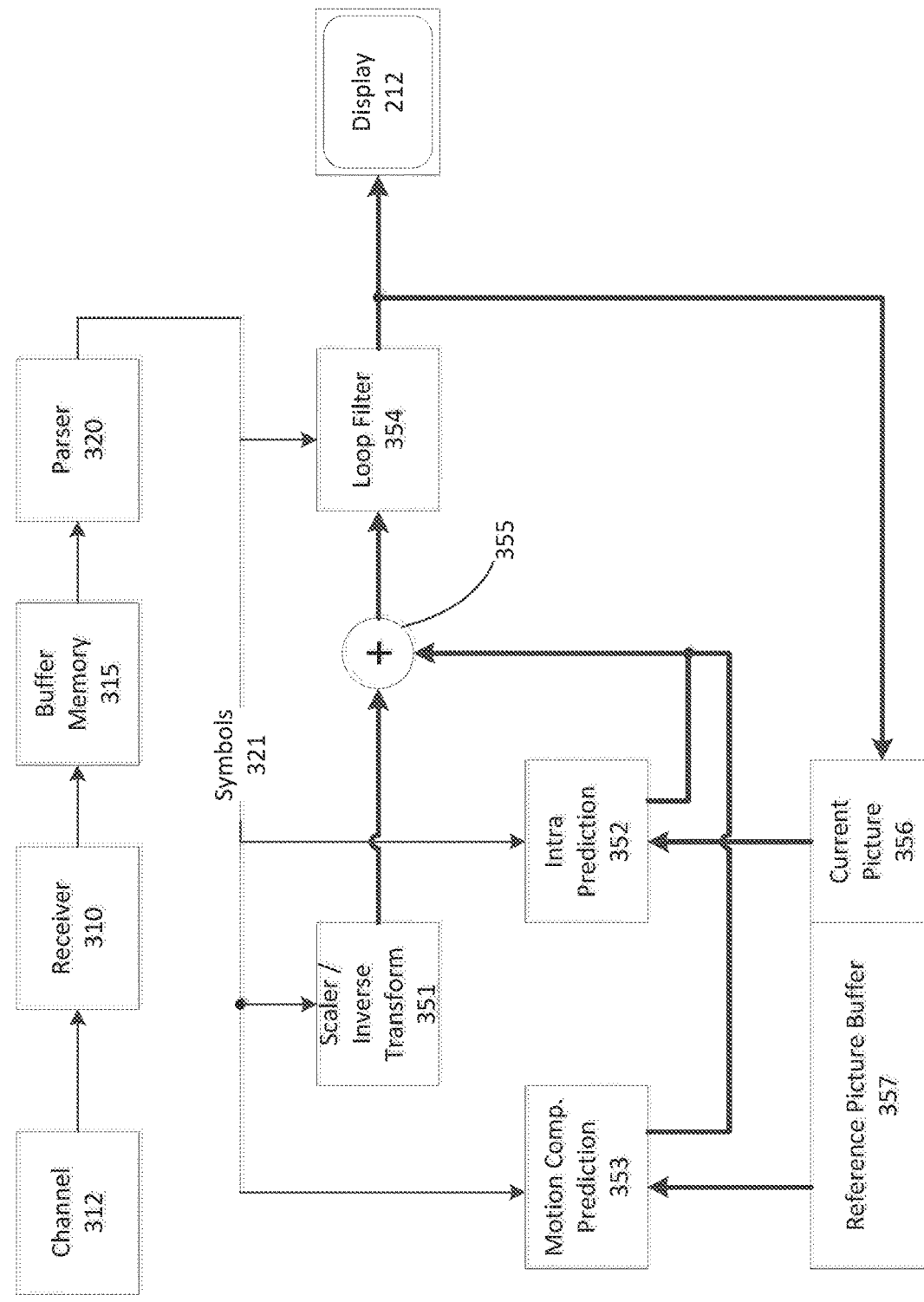
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include an parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (354). Video compression technologies can include in-loop filter technologies that are controlled by parameters included in the coded video bitstream and made available to the loop filter unit (354) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (354) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
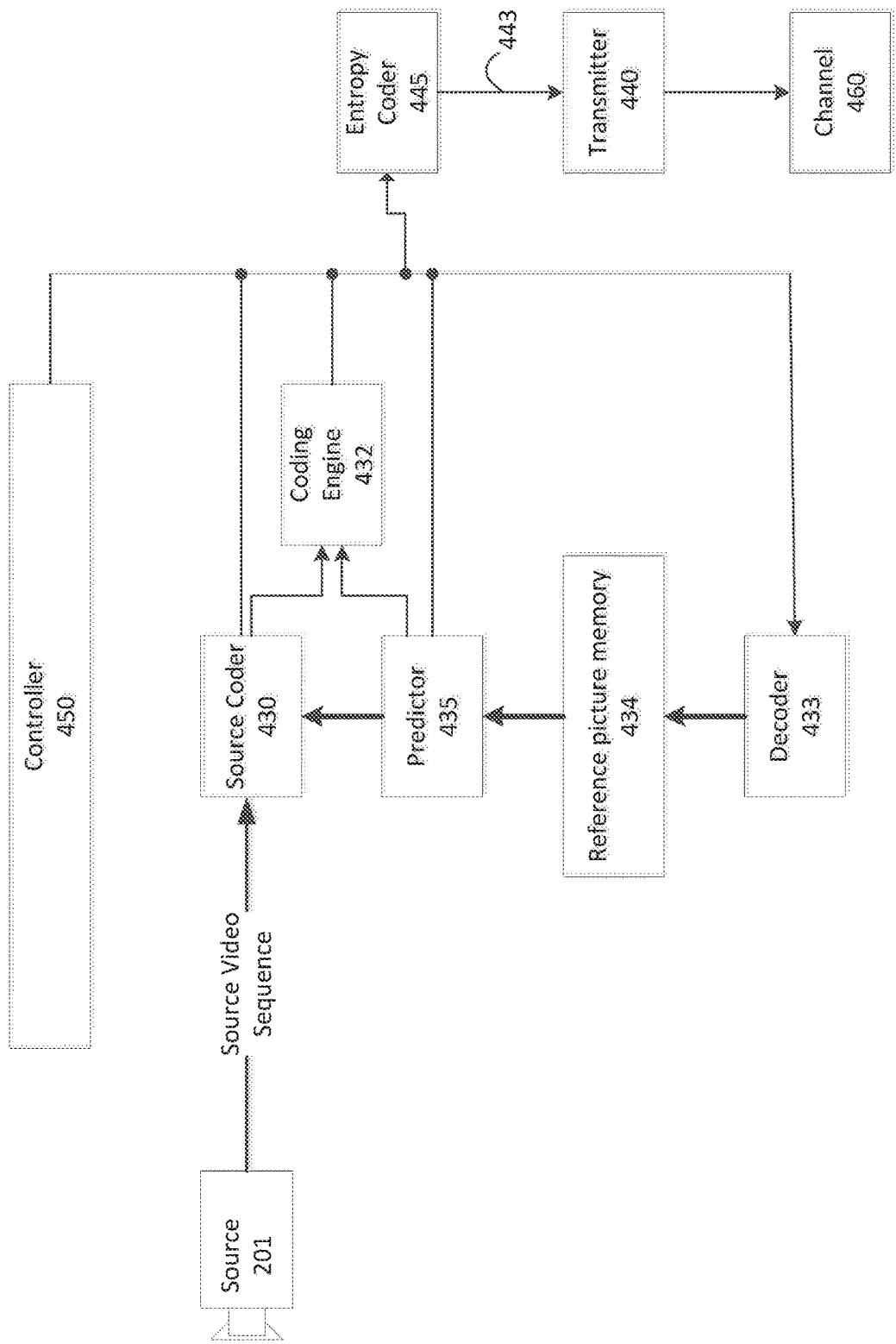
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Referring to FIG. 5, in an embodiment, a flag (e.g., adaptive picture resolution) (502) may indicate whether the spatial resolution of a picture segment (e.g. tile, tile group, CTU, CTU group) may be adaptively resampled/rescaled/unscaled (the three terms are used interchangeably throughout) for decoding, referencing for prediction, and output for display (collectively RPR information). If said flags indicates the presence of RPR information, certain syntax elements can indicate the picture size of reference pictures and output pictures, respectively. These syntax elements and the aforementioned flag may be in any suitable high level syntax structure, to include, for example, decoder/video/sequence/picture/slice/tile parameter sets, sequence/GOP/picture/ slice/GOB/group of tile/tile headers, and/or SEI messages. Not all of these syntax elements need always to be present. For example, while the RPR resolution may be dynamic, the aspect ratio of a picture may be fixed in a video coding technology or standard, or that fixing may be signaled in flags in an appropriate high level syntax structure. Similarly, a video coding technology or standard may specify reference picture resampling and omit output picture resampling, in which case the output picture size information may also be omitted. In yet another example, the presence of the output picture size information may be conditioned on its own flag (not depicted).

In one example, and not as a limitation, certain RPR information may be in a sequence parameter set (501). Syntax elements reference_pic_width_in_luma_samples (503), and reference_pic_height_in_luma_samples (504) may indicate the width and the height of the reference pictures, respectively. Syntax elements output_pic_width_in_luma_samples (505) and output_pic_height_in_luma_samples (506), may specify the output picture resolution. All aforementioned values can be in the unit of luminance samples or other units as they may be common in a video compression technology or standard. Certain restrictions on their values may also be imposed by the video coding technology or standard; for example, the values of one or more of the syntax elements may be required to be a certain power of two (so to allow for easy fitting of the picture into blocks commonly used in video coding) or the relationship between horizontal sizes may be limited to certain values (so to allow for a finite set of filter designs optimized for certain resolution ratios, as described below).

The encoding of the aforementioend information can be in any suitable form. One simple option, as depicted, can be the use of a variable length, unsiged integer value denoted by ue(v). Other options are always possible including those options used for the indication of a picture size in legacy video coding technologies or standards such as H.264 or H.265.

One purpose of the disclosed subject matter is to allow for RPR inside the coding loop; that is, between different pictures in a coded video sequence (CVS). Therefore, syntax elements specifying the actual decoded size of a picture may need to be in a syntax structure that allows changing them, potentially from one picture to another, within a CVS. In an embodiment, syntax elements decoded_pic_width_in_luma_samples (508) and decoded_pic_height_in_luma_samples (509) are present in an appropriate high level syntax structure, here a PPS (507), and the values of the fields may change within a coded video sequence (CVS). Other suitable high level syntax structures may include PPS, slice parameter set, tile parameter set, picture/slice/GOB/group of tile/tile headers, and/or SEI messages. Using SEI messages may be less advisable because RPR techniques may have normative impact on the decoding process. As for the coding of these syntax elements, the remarks above apply.

In an embodiment, reference_pic_width_in_luma_samples and reference_pic_height_in_luma_samples may indicate the picture resolution of a reference picture or a reference picture segment in a decoded picture buffer. That can imply that the reference pictures are always kept in a full resolution, independent of the resampling applied, and is one key different between the techniques discussed herein and those described in H.263 Annex P.

The above description assumes RPR techniques to be applied to a whole picture. Certain environments may benefit from RPR techniques applicable to picture segments, such as group of tiles, tiles, slices, GOBs, and similar. For example, a picture may be spatially divided into semantically different spatial regions, commonly known as tiles. One example would be security video, and another would be various views in a 360 degree video with, for example, cube projection (where six views, corresponding to the siz surfaces of a cube, make up for the representation of a 360 degree scene). In such and similar scenarios, the semantically distinct content of each tile may require RPR techniques to applied differently, per tile base, as the content activity per tile may be different. Accordingly, in an embodiment, RPR techniques can be applied per tile. This requires signaling on a per tile basis (not depicted). Those signalling techniques can be similar as the ones described above for per picture signaling, except that the signalling may need to be included for potentially multiple tiles.

In an embodiment, each tile or tile group may have different values of reference_tile_width_in_luma_samples and reference_tile_height_in_luma_samples in a tile group header or a header parameter set or other suitable high level syntax structure.

In an embodiment, if a reference picture resolution is different from a decoded picture resolution, a decoded picture may be rescaled in relation to a ratio between the reference picture resolution and the decoded picture resolution, and then the rescaled decoded picture may be stored in a decoded picture buffer (DPB) as a reference picture.

In an embodiment, if a vertical/horizontal resolution ratio between the decoded picture resolution and the reference picture resolution is explicitly signaled as outlined above, a decoded picture may be rescaled in relation to the signaled ratio, and then the rescaled decoded picture may be stored in a decoded picture buffer (DPB) as a reference picture.

In an embodiment, output_pic_width_in_luma_samples and output_pic_height_in_luma_samples may indicate the picture resolution of a output picture or a output picture segment to a video player.

In an embodiment, if an output picture resolution is different from a reference picture resolution, a reference picture may be rescaled in relation to a ratio between the output picture resolution and the reference picture resolution, and then the rescaled reference picture may be bumped out as an output picture from a DPB and fed into a video player to display the picture.

In an embodiment, if a vertical/horizontal resolution ratio between the reference picture resolution and the output picture resolution is explicitly signaled, a reference picture may be rescaled in relation to a ratio between the output picture resolution and the reference picture resolution, and then the rescaled reference picture may be bumped out as an output picture from a DPB and fed into a video player to display the picture.

In an embodiment, each tile or tile group may have different values of output_tile_width_in_luma_samples and output_tile_height_in_luma_samples in a tile group header or a header parameter set or other suitable syntax structure.

Certain video coding technologies or standards include temporal scalability in the form of temporal sub-layers. In an embodiment, each sub-layer may have different values of reference_pic_width_in_luma_samples, reference_pic_height_in_luma_samples, output_pic_width_in_luma_samples, output_pic_height_in_luma_samples, decoded_pic_width_in_luma_samples, decoded_pic_height_in_luma_samples. The syntax elements for each sub-layer may be signaled, for example in a SPS, or any other suitable high level syntax structure.

Figure 6:
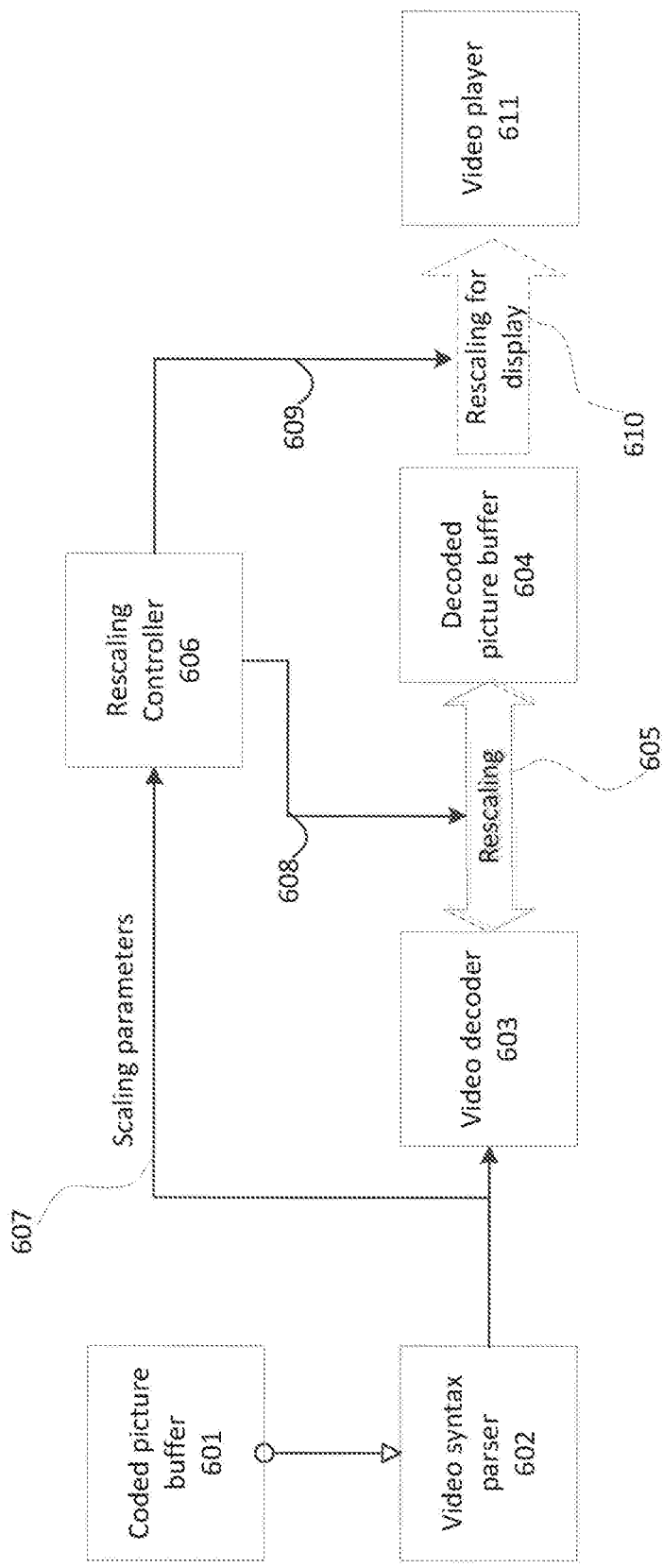
FIG. 6 is a schematic illustration of a simplified block diagram of a Reference Picture Resampling capable decoder in accordance with an embodiment.

Referring to FIG. 6, in an embodiment, a video bitstream parser (602) may parse and interpret the above syntax elements and other syntax elements from a coded video bitstream received from a coded picture buffer (601). A video decoder, in receipt of non-RPS related syntax elements from the coded video bitstream may reconstruct the coded picture in potentially downsampled resolution. In order to do so, it may need reference samples, which it may received from a decoded picture buffer (604). As, according to an embodiment, the decoded picture buffer (604) stores reference pictures or segments in full resolution, a rescaling (605) may be required to provide the decoder (603) with an appropriately resampled reference picture. The recalling (603) may be controlled by a rescaling controller (606), which may have received the scaling parameters (for example the syntax elements mentioned above) (607) and converted them into suitable information (608) for the rescaler (605); for example, calculating appropriate rescaling filter parameters. Finally, if output resolution rescaling is also desired, the rescaling controller (606) may also provide rescaling information 609 to a mechanism that rescales for display (610). Finally, the reconstructed video may be played by a video player (611) or otherwise processed for consumption or storage.

The filters used in the rescaling process can be specified in a video coding technology or standard. As both filtering directions are required "inside" the coding loop—that is, both downsample (from, for example, decoded picture buffer (604) to video decoder (603)) and upsample (from, for example, video decoder (603) to decoded picture buffer (604)), both filtering directions may be required as fully specified, and should be specified by a video compression technology or standard for as much reversibility as possible. As for the filter design itself, a balance between computational/implementation simplicity and performance may need to be kept. Certain initial results indicate that a bi-linear filter as suggested in H.263 Annex P may be sub-optimal from a performance viewpoint. On the other hand, certain adaptive filtering techniques employing neural networks based processing may be too computationally complex to enable widespread adoption of the video coding technology or standard in a commercially suitable timeframe and under commercially suitable complexity constraints. As a balance, filter designs such as the one used in SHVC or various interpolation filters as in use in HEVC may be appropriate, and would have the additional advantage that their properties may be well understood.

Figure 7:
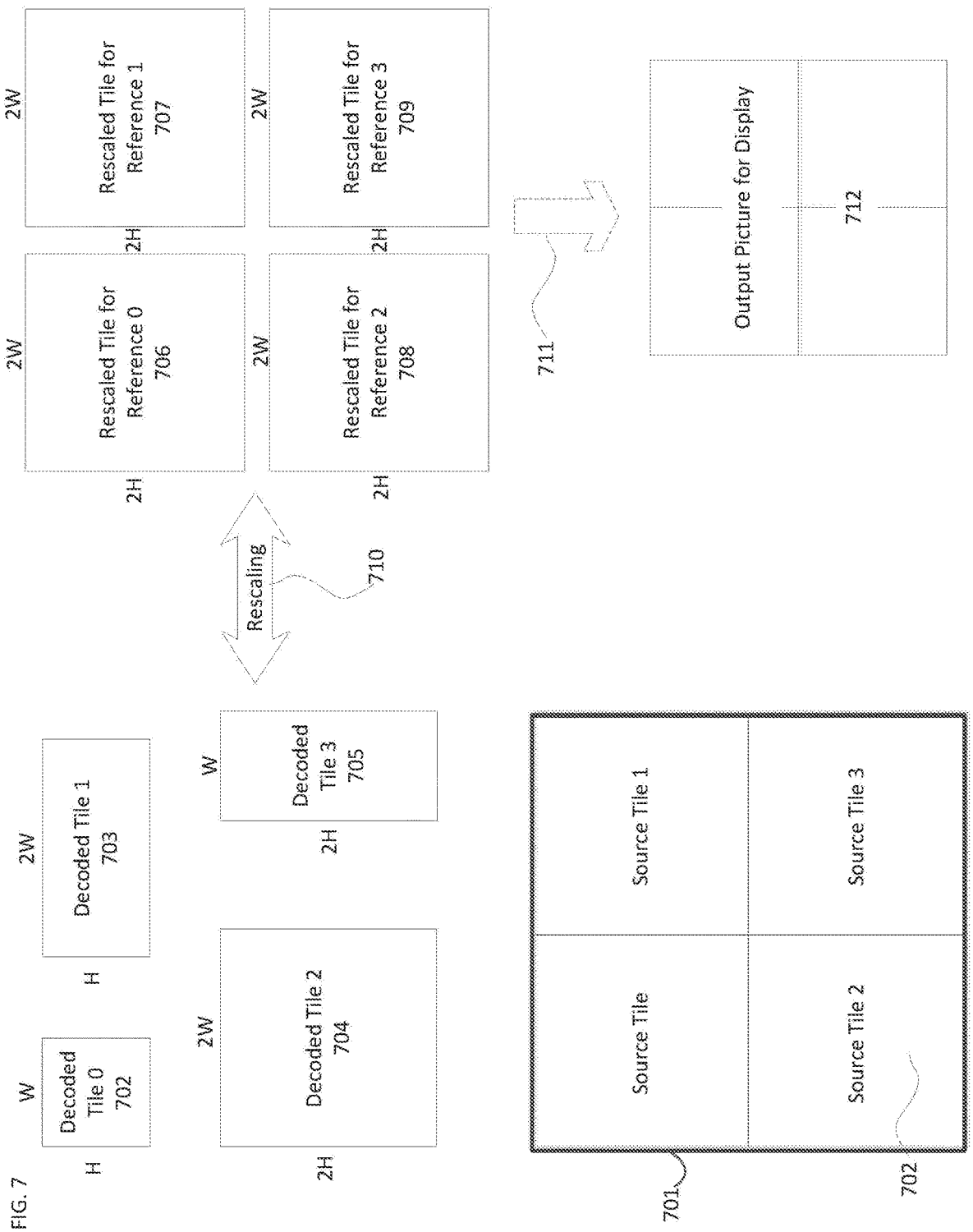
FIG. 7 is a schematic illustration of a tile layout using Reference Picture Resampling per tile, in accordance with an embodiment.

Referring to FIG. 7, in an embodiment, each picture segment, such as slice, GOB, tile or tile group (tile henceforth) may be independently rescaled from a decoded tile to a reference tile, and from a reference tile to an output tile (or picture), with a different resolution.

Consider an input picture (701) into the encoder that square, and is divided into four square source tiles (702) showing the Source Tile 2 of the four source tiles) each covering $\frac{1}{4}^{th}$ of the input picture. Of course, according to the disclosed subject matter, other picture geometries and tile layouts are equally possible. Let each tile have a width and height of 2 times W and 2 times H, respectively, denoted henceforth as "2 W" for two times width and "2H" for two times height (and similar for other numerals; for example, 1 W means 1 times width, and 3H means 3 times height—this convention is used throughout the figure and its description). The source tiles could, for example be, for camera views of different scenes in a security camera environment. As such, each tile may cover content with potentially radically different level of activity, possibly requiring different RPR selections for each tile.

Assume, the encoder (not depicted) created a coded picture that, after reconstruction, results into the four tiles having rescaled resolutions as follows:

Decoded tile 0 (702): 1H and 1 W
Decoded tile 1 (703): 1H, and 2 W
Decoded tile 2 (704): 2H and 2 W
Decoded tile 3 (705): 2H and 1 W This results in decoded tile sizes as depicted to scale.

Note that in certain video coding technologies or standards, there may be certain samples in the decoded picture that are not allocated to any tile. How, if at all, those samples may be coded can differ from one video coding technology to another. In an embodiment, in certain cases, the samples not allocated to any of the tiles depicted may be allocated to other tiles, and all their samples may be coded in a form that creates a low number of coded bits, for example in skip mode. In an embodiment, the video coding technology or standard may not have the (currently somewhat common) requirement that all samples of a picture must be coded in some form in each video picture, and therefore, no bits may be wasted on those samples. In yet another embodiment, certain padding techniques may be used to efficiently populate unused samples such that their coding overhead is negligible.

In this example, the reference picture buffer keeps the reference picture samples at full resolution, which in this case is the same as the source resolution. Accordingly, the four rescaled tiles for reference (706 through 709) may be kept at 2H and 2 W resolution, respectively. In order to match the varying resolutions of the decoded tiles (702 through 705), the rescaling (710) in both directions from decoder to reference picture buffer and in reverse, can be different for each tile.

If output rescaling (711) is also in use, the output of the decoded picture buffer may be rescaled, on either a per tile or a per picture granularity, to an output picture for display (or otherwise processing) (712). The output picture for display (712) may be larger or smaller in resolution than the pictures in the decoded picture buffer.

Figure 8A:
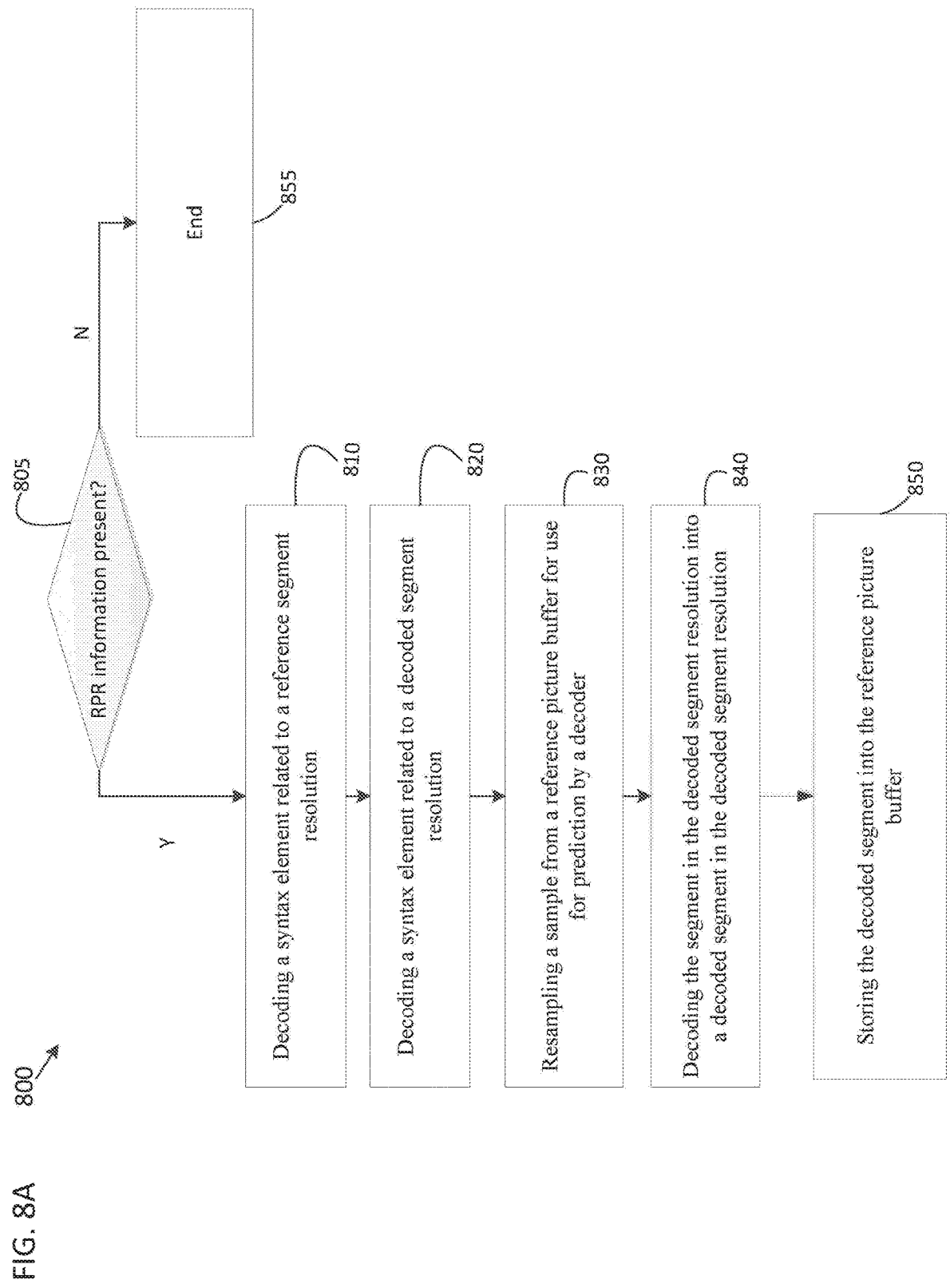
FIG. 8A is a flowchart illustrating a method of decoding a coded picture of a coded video sequence, according to an embodiment.

FIG. 8A is a flowchart illustrating a method (800) of decoding a coded picture of a coded video sequence, according to an embodiment. In some implementations, one or more process blocks of FIG. 8A may be performed by the decoder (210). In some implementations, one or more process blocks of FIG. 8A may be performed by another device or a group of devices separate from or including the decoder (210), such as the encoder (203).

Referring to FIG. 8A, the method (800) includes determining whether RPR information is present (805), and if it is determined that RPR information is not present then the method ends (855). If it is determined that RPR information is present then the method includes decoding, from a first high level syntax structure for a plurality of pictures, a syntax element related to a reference segment resolution (810).

The method (800) includes decoding, from a second high level syntax structure that changes from a first coded picture to a second coded picture, a syntax element related to a decoded segment resolution (820).

The method (800) includes resampling a sample from a reference picture buffer for use for prediction by a decoder, the decoder decoding a segment at decoding resolution, and the sample from the reference picture buffer is in the reference segment resolution (830).

The method (800) includes decoding the segment in the decoded segment resolution into a decoded segment in the decoded segment resolution (840).

Further, the method (800) includes storing the decoded segment into the reference picture buffer (850).

The method (800) may further include resampling the decoded segment into the reference segment resolution.

The method (800) may further include a resampling filter used for at least one of the resampling the sample from the reference picture buffer for use for prediction by a decoder and the resampling the decoded segment into the reference segment resolution, wherein the resampling filter is more computationally complex than a bi-linear filter and is non-adaptive.

The method (800) may further include wherein the resampling filter is chosen from a plurality of resampling filters based on the relationship between decoding resolution and reference segment resolution.

The method (800) may further include wherein the segment is a picture.

The method (800) may further include wherein each of the first coded picture and the second coded picture contains a plurality of segments.

The method (800) may further include decoding, from a third high level syntax structure, a syntax element related to an output resolution; and resampling a sample of the decoded segment to the output resolution.

The method (800) may further include wherein the resampling uses different resampling factors for width and height.

Although FIG. 8A shows example blocks of the method (800), in some implementations, the method (800) may include additional blocks, fewer blocks, different blocks, or differently arranged blocks than those depicted in FIG. 8A. Additionally, or alternatively, two or more of the blocks of the method (800) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8B:
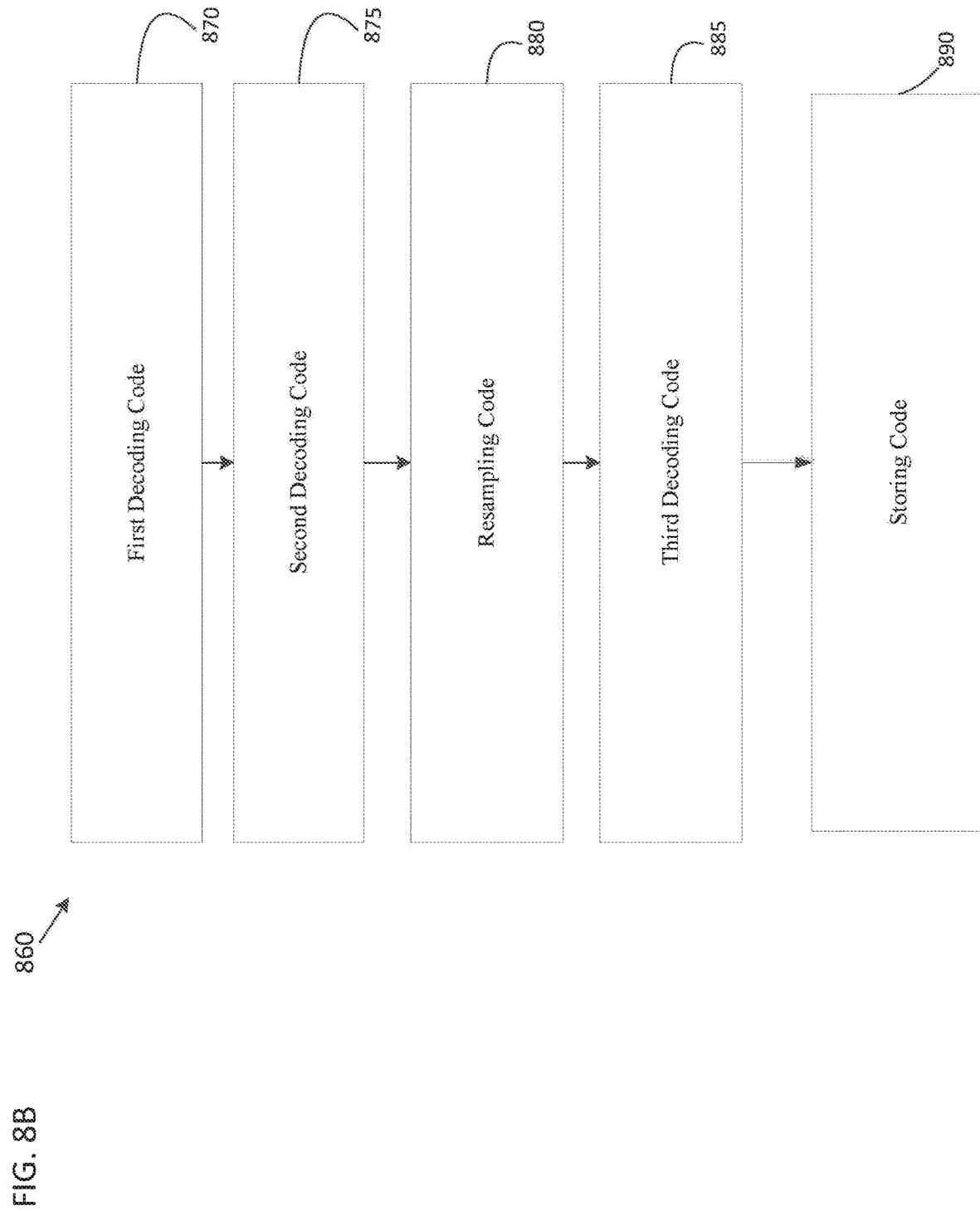
FIG. 8B is a simplified block diagram of an apparatus for controlling decoding of a video sequence, according to an embodiment.

FIG. 8B is a simplified block diagram of an apparatus (860) for decoding a coded picture of a video sequence, according to an embodiment.

Referring to FIG. 8B, the apparatus (860) includes first decoding code (870), second decoding code (875), resampling code (880), third decoding code (885), and storing code (890).

The first decoding code (870) is configured to decode, from a first high level syntax structure for a plurality of pictures, a syntax element related to a reference segment resolution.

The second decoding code (875) is configured to decode, from a second high level syntax structure that changes from a first coded picture to a second coded picture, a syntax element related to a decoded segment resolution.

The resampling code (880) is configured to resample, a sample from a reference picture buffer for use for prediction by a decoder, the decoder decoding a segment at decoding resolution, and the sample from the reference picture buffer is in the reference segment resolution.

The third decoding code (885) is configured to decode the segment in the decoded segment resolution into a decoded segment in the decoded segment resolution.

The storing code (890) is configured to store the decoded segment into the reference picture buffer.

The techniques described above, can be implemented as computer software using computer-readable instructions and physically stored in one or more computer-readable media.

The techniques for Adaptive Picture Resolution Rescaling described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in an embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include GSM, 3G, 4G, 5G, LTE, cloud, and the like, TV wireline or wireless wide area digital networks to include cable TV, satellite TV, and terrestrial broadcast TV, vehicular and industrial to include CANBus, and so forth. Certain networks (955) commonly require external network interface adapters (954) that attached to certain general purpose data ports or peripheral buses (949) (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks (955), computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, Graphics Adapter 950, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of decoding a coded picture of a coded video sequence, the method being performed by at least one processor and the method comprising:
   decoding, from a first high level syntax structure for a plurality of pictures, a syntax element related to a reference picture resolution and a reference tile resolution;
   decoding, from a second high level syntax structure that changes from a first coded picture to a second coded picture, a plurality of syntax elements related to a plurality of decoded tile resolutions, the first coded picture comprising a plurality of tiles at different resolutions that correspond to the plurality of decoded tile resolutions;
   obtaining a sample from a reference picture buffer for use for prediction by a decoder, the sample from the reference picture buffer being in the reference picture resolution;
   decoding the plurality of tiles in the different resolutions into a plurality of decoded tiles in the plurality of decoded tile resolutions;
   resampling the plurality of decoded tiles so a resolution of each resampled segment matches the reference tile resolution and a resolution of a source tile from which a corresponding decoded segment was encoded, wherein a resolution of a combination of the resampled tiles matches the reference picture resolution; and storing the plurality of decoded tiles into the reference picture buffer.

2. The method of claim 1, wherein a resampling filter is used for at least one of resampling the sample from the reference picture buffer for use for prediction by a decoder and the resampling the plurality of decoded tiles into the reference tile resolution, wherein the resampling filter is a non-adaptive interpolation filter.

3. The method of claim 2, wherein the resampling filter is chosen from a plurality of resampling filters based on a relationship between decoding resolution and reference picture resolution.

4. The method of claim 1, further comprising:

decoding, from a third high level syntax structure, a syntax element related to an output resolution; and resampling a sample of the plurality of decoded tiles to the output resolution.

5. The method of claim 1, wherein the resampling uses different resampling factors for width and height.

6. An apparatus for decoding a coded picture of a coded video sequence, the apparatus comprising:

at least one memory configured to store computer program code; and at least one processor configured to access the at least one memory and operate according to the computer program code, the computer program code comprising:

first decoding code configured to decode, from a first high level syntax structure for a plurality of pictures, a syntax element related to a reference picture resolution and a reference tile resolution;

second decoding code configured to decode, from a second high level syntax structure that changes from a first coded picture to a second coded picture, a plurality of syntax elements related to a plurality of decoded tile resolutions, the first coded picture comprising a plurality of tiles at different resolutions that correspond to the plurality of decoded tile resolutions;

first obtaining code configured to obtain, a sample from a reference picture buffer for use for prediction by a decoder, the sample from the reference picture buffer being in the reference picture resolution;

third decoding code configured to decode the plurality of tiles in the different resolutions into a plurality of decoded tiles in the plurality of decoded tile resolutions;

first resampling code configured to resample the plurality of decoded tiles so a resolution of each resampled tile matches the reference tile resolution and a resolution of a source tile from which a corresponding decoded tile was encoded, wherein a resolution of a combination of the resampled tiles matches the reference picture resolution; and storing code configured to store the plurality of decoded tiles into the reference picture buffer.

7. The apparatus of claim 6, wherein a resampling filter is used for at least one of resampling the sample from the reference picture buffer for use for prediction by a decoder and the resampling the plurality of decoded tiles into the reference tile resolution, wherein the resampling filter is a non-adaptive interpolation filter.

8. The apparatus of claim 7, wherein the resampling filter is chosen from a plurality of resampling filters based on a relationship between decoding resolution and reference picture resolution.

9. The apparatus of claim 6, wherein the resampling uses different resampling factors for width and height.

10. A non-transitory computer-readable storage medium storing a program for decoding a coded picture of a coded video sequence, the program comprising instructions that cause a processor to:

decode, from a first high level syntax structure for a plurality of pictures, a syntax element related to a reference picture resolution and a reference tile resolution;

decode, from a second high level syntax structure that changes from a first coded picture to a second coded picture, a plurality of syntax elements related to a plurality of decoded tile resolutions, the first coded picture comprising a plurality of tiles at different resolutions that correspond to the plurality of decoded tile resolutions;

obtain, a sample from a reference picture buffer for use for prediction by a decoder, the sample from the reference picture buffer being in the reference picture resolution;

decode the plurality of tiles in the different resolutions into a plurality of decoded tiles in the plurality of decoded tile resolutions;

resample the plurality of decoded tiles so a resolution of each resampled tile matches the reference tile resolution and a resolution of a source tile from which a corresponding decoded tile was encoded, wherein a resolution of a combination of the resampled tiles matches the reference picture resolution; and store the plurality of decoded tiles into the reference picture buffer.

11. The non-transitory computer-readable storage medium of claim 10, wherein a resampling filter is used for at least one of resampling the sample from the reference picture buffer for use for prediction by a decoder and the resampling the plurality of decoded tiles into the reference tile resolution, wherein the resampling filter is a non-adaptive interpolation filter.

12. The non-transitory computer-readable storage medium of claim 11, wherein the resampling filter is chosen from a plurality of resampling filters based on a relationship between decoding resolution and reference picture resolution.

* * * * *